(12) United States Patent
Wu et al.

(10) Patent No.: US 9,104,942 B2
(45) Date of Patent: Aug. 11, 2015

(54) PERCEPTUAL BIAS LEVEL ESTIMATION FOR HAND-DRAWN SKETCHES IN SKETCH-PHOTO MATCHING

(71) Applicant: Hong Kong Applied Science and Technology Research Institute Company Limited, Hong Kong (HK)

(72) Inventors: Tai Pang Wu, Hong Kong (HK); Zhiqian Li, Hong Kong (HK); Kenneth Kwan Yee Wong, Hong Kong (HK)

(73) Assignee: Hong Kong Applied Science and Technology Research Institute Company Limited, Hong Kong Science Park, Shatin, New Territories, Hong Kong (CN)

(*) Notice: Subject to any disclaimer, the term of this patent is extended or adjusted under 35 U.S.C. 154(b) by 268 days.

(21) Appl. No.: 13/719,231

(22) Filed: Dec. 19, 2012

(65) Prior Publication Data
US 2014/0169677 A1 Jun. 19, 2014

(51) Int. Cl.
*G06K 9/62* (2006.01)
*G06K 9/46* (2006.01)
*G06K 9/00* (2006.01)

(52) U.S. Cl.
CPC .............. *G06K 9/46* (2013.01); *G06K 9/00268* (2013.01); *G06K 9/00456* (2013.01); *G06K 9/623* (2013.01)

(58) Field of Classification Search
None
See application file for complete search history.

(56) References Cited

U.S. PATENT DOCUMENTS 6,741,655 B1 5/2004 Chang et al.
2013/0107071 A1* 5/2013 Tang et al. ................. 348/222.1

FOREIGN PATENT DOCUMENTS

WO WO2012120467 A1 9/2012

OTHER PUBLICATIONS

Kato et al., "A Sketch Retrieval method for Full Color Image Database, Query by Visual Example" IEEE Publication, 1992, pp. 530-533.*
Leung et al., "Hierarchical Matching for Retrieval of Handdrawn Sketches", IEEE Publication, 2003, pp. II-29-II-32.*
(Continued)

*Primary Examiner* — Brian P Werner
(74) *Attorney, Agent, or Firm* — Ella Cheong Hong Kong; Sam T. Yip

(57) ABSTRACT

This invention, which relates to retrieving an object from a video or a photo where the object matches a hand-drawn sketch, discloses a method for automatically estimating a perceptual bias level with respect to a feature of the sketch. The method allows estimation based on the sketch alone without involving an extra database. In one embodiment, the method comprises using an expectation-maximization tensor voting (EMTV) method to analyze a statistical distribution of the feature. The statistical distribution is analyzed by forming an objective function having the statistical distribution's information parameterized by the perceptual bias level, and then maximizing the objective function according to a set of iterative update rules. In another embodiment, the method for automatically estimating a perceptual bias level is incorporated into a method for retrieving one or more objects from an image or video database where the one or more objects match a hand-drawn sketch.

10 Claims, 4 Drawing Sheets

(56) References Cited

OTHER PUBLICATIONS

Folco Banfi, "Content-Based Image Retrieval Using Hand-Drawn Sketches and Local Features: a Study on Visual Dissimilarity," a thesis submitted to Université de Fribourg (Suisse), Aug. 23, 2000.

T.-P. Wu, S.-K. Yeung, J. Jia, C.-K. Tang and G. Medioni, "A closed-form solution to tensor voting: theory and applications," IEEE Transactions on Pattern Analysis and Machine Intelligence, vol. 34, pp. 1482-1495, Aug. 2012.

* cited by examiner

Examples of Hand-Drawn Sketches

Pencil Sketch
110

Line Art
120

Identikit
130

Colored Picture (color not shown)
150

PERCEPTUAL BIAS LEVEL ESTIMATION FOR HAND-DRAWN SKETCHES IN SKETCH-PHOTO MATCHING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to retrieving an object from a video or a photo where the object matches a hand-drawn sketch provided as a reference. In particular, this invention relates to automatic estimation of a perceptual bias level of an extracted feature of the hand-drawn sketch directly from the sketch alone without involving an extra database.

BACKGROUND

In some computer applications, it is required to search in a video clip or in a photo for an object that matches a reference figure provided by a hand-drawn sketch. Most notably, an important one of these applications is in law enforcement where a picture of a criminal suspect is given as a hand-drawn sketch prepared by an artist according to description of an eyewitness.

In one typical approach, a computer search of an object that matches a hand-drawn sketch is carried out by first extracting statistical information of a feature (intensity, color, gradient, edge, texture, etc.) of the sketch and then identifying an object in the video clip or in the photo where the object has similar statistical information for the feature. For both a camera-captured photo/video and a hand-drawn sketch, the statistical information depends on the visual content that is encoded in the image. The photo/video truly reveals what is captured by the camera, whereas the sketch reveals the perceptual content of the artist or the author in general. It follows that the sketch somehow includes an element of a perceptual bias of the author. Taking into consideration the perceptual bias of the sketch in the search of a matched object is desirable in order to enhance the success rate of matching.

In WO2004/027692, a method for enhancing the success rate of sketch-photo matching is disclosed. The approach adopted in the method is to transform a photo image into a pseudo sketch, or an original hand-drawn sketch into a pseudo photo, such that the difference between the photo and the original sketch is reduced after transformation, thereby facilitating the computer search. Such transformation can be implemented in the presence of a database preferably containing all possible sketch types, a requirement that is difficult to fulfill. In the absence of such large database, a smaller database containing a sufficient number of photo-sketch pair examples may be used to facilitate training of the transformer on-the-fly. Nonetheless, an extra database is inevitably required in the implementation of the method disclosed in WO2004/027692.

In *Content-Based Image Retrieval Using Hand-Drawn Sketches and Local Features: a Study on Visual Dissimilarity*, a thesis authored by Folco Banfi and submitted to Université de Fribourg (Suisse), 2000, it is disclosed a weighting scheme having an effect similar to estimating perceptual bias levels. The weighting scheme gives pre-defined or pre-computed weights for sketches specifically drawn in certain types of sketch style or outline. Apart from the limitation that the weighting scheme is only for specific types of sketch style, the weights are fixed and are not obtained by taking into account individual variations from one hand-drawn sketch to another. Automatic computation of the weights based on a sketch to be used in the object search is more desirable.

There is a need in the art for automatic computation of a perceptual bias level evaluated for a hand-drawn sketch without a need for an extra database in the computation.

SUMMARY OF THE INVENTION

An aspect of the present invention is to allow automatic estimation of a perceptual bias level with respect to a feature of a hand-drawn sketch based on the sketch alone. The method for this automatic estimation comprises using an expectation-maximization tensor voting (EMTV) method to analyze a statistical distribution of the feature. The statistical distribution is analyzed by first forming an objective function having the statistical distribution's information parameterized by the perceptual bias level, and then maximizing the objective function according to a set of iterative update rules. The objective function is given by EQN. (5) and the set of iterative update rules is given by EQNS. (6)-(12), where EQNS. (5)-(12) will be shown in the specification below.

The aforementioned method for automatically estimating a perceptual bias level can be incorporated into a method for retrieving one or more objects from an image or video database where the one or more objects match a hand-drawn sketch. In the retrieving method, one or more candidate features are selected. For a chosen candidate feature among the one or more candidate features, a perceptual bias level with respect to the chosen candidate feature of the sketch is estimated according to the aforementioned method for automatically estimating a perceptual bias level. As a result, a perceptual bias level for each of the one or more candidate features is generated. One or more adopted features are then selected among the one or more candidate features. This selection is done by eliminating one or more unimportant candidate features among the one or more candidate features wherein the perceptual bias level generated for any of the one or more unimportant candidate features is less than a threshold. However, if all the perceptual bias levels generated for the one or more candidate features are less than the threshold, one candidate feature whose perceptual bias level is largest among the perceptual bias levels generated for the one or more candidate features is then selected. Note that this one candidate feature is selected from the one or more candidate features. A search in the database is conducted to identify the one or more objects that match the sketch. The search is based on a similarity measurement according to the one or more adopted features. In the similarity measurement, a contribution of a chosen adopted feature is weighted by the perceptual bias level generated for the chosen adopted feature, the chosen adopted feature being any of the one or more adopted features.

The method for automatically estimating a perceptual bias level may also be utilized in a system for retrieving one or more objects that match a hand-drawn sketch. The system comprises a database having a first set of raw visual features extracted from a set of images, and one or more processors configured to execute a query process elaborated as follows. The query process comprises extracting a second set of raw visual features from the hand-drawn sketch. For each feature in the second set of raw visual features, a perceptual bias level with respect to said each feature is estimated according to the disclosed method for automatically computing a perceptual bias level. A statistical distribution model for said each feature is also obtained. In the query process, the database is searched for identifying the one or more objects in the set of images where statistical information of the one or more objects substantially matches weighted statistical information obtained by weighting statistical information of the raw visual features in the second set according to the perceptual bias levels estimated for the second set of raw visual features.

DETAILED DESCRIPTION

Matching an object in a photo or a video clip with a reference figure provided by a hand-drawn sketch can be done by first extracting one or more features from the sketch and then comparing these extracted features with the features of different objects in the photo or the video clip so as to identify one or more matched objects from these different objects. A feature can be a low-level one such as intensity, color, gradient, etc., or a high-level feature such as texture, shape, optical flow, etc.

Figure 1:
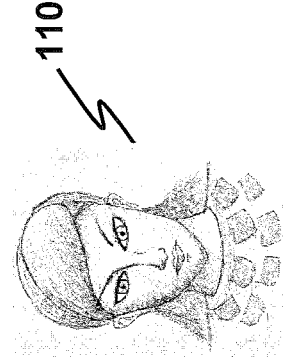
FIG. 1 depicts different types of hand-drawn sketches.
Figure 1:
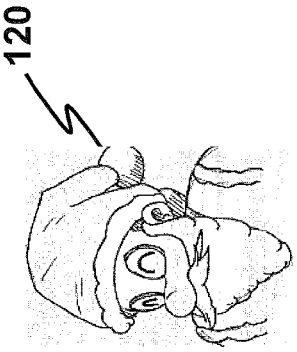
Figure 1:
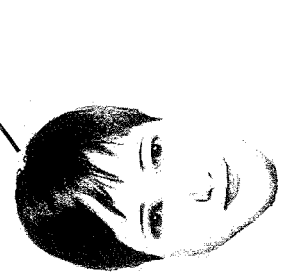
Figure 1:
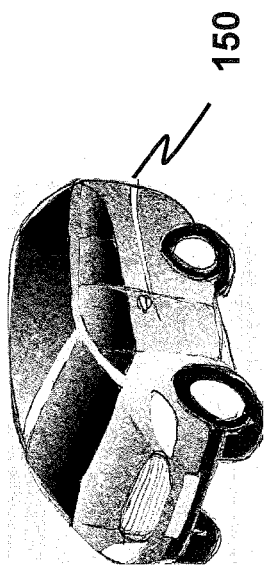

FIG. 1 shows a variety of different kinds of hand-drawn sketches. In one example, shading is added to a pencil sketch 110, indicating that the author of the sketch is perceptually more biased to provide information of the figure in the sketch on texture, intensity and gradient. In another example, since a line-art sketch 120 (which is a face) is formed by lines, the author of the sketch is more focused on information regarding the shape (of face and of facial features). In a further example, the author of a colored picture 150 may tend to emphasize on using different colors to describe the figure in the sketch. In the aforementioned examples, it is seen that a perceptual bias with respect to a feature under consideration is present for a hand-drawn sketch.

Without loss of generality and for the sake of convenience in illustration hereinafter, a perceptual bias level is defined as a non-negative real number quantifying the importance or saliency of a feature under consideration on representing the information encoded in the visual content of a hand-drawn sketch. In particular, a zero value of the perceptual bias level is defined herein to mean that the feature under consideration is not usable to represent the information encoded in the visual content of the sketch. Furthermore, a higher positive value of the perceptual bias level indicates that the feature under consideration is more usable in identifying matched objects in a video clip or in a photo. Note that without departing from the spirit of the present invention, it is possible that the perceptual bias level may be defined in another range of the real number.

Figure 2:
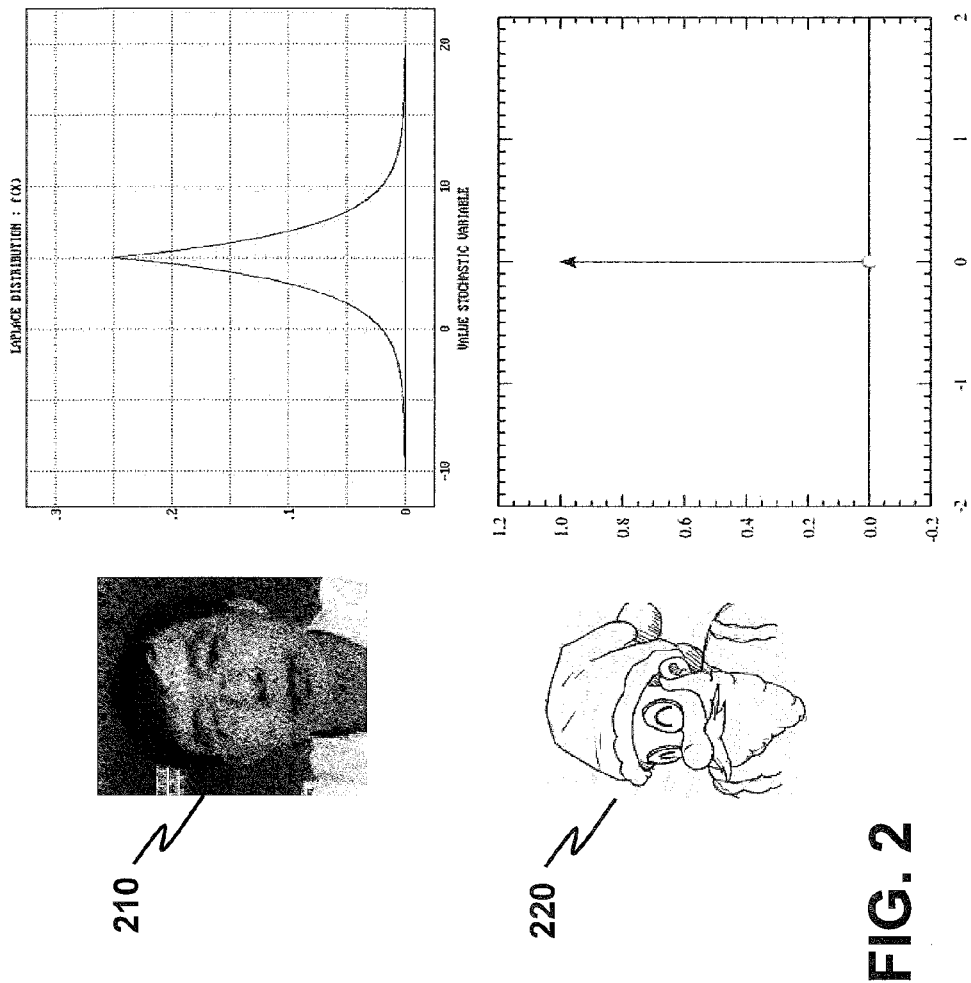
FIG. 2 provides an example to illustrate a difference between a natural image and a hand-drawn sketch in the statistical information encoded in both of them.

FIG. 2 provides an example to illustrate a difference between a natural image and a hand-drawn sketch. As an example, the hand-drawn sketch is a line-art sketch. For a natural image 210, which is a realistic photo, a statistical distribution of the gradient typically follows a Laplacian distribution. For a line-art sketch 220, however, the gradient tends to give a statistical distribution that is almost like an impulse. This implies that the shading of the line-art sketch 220 is not gradually changing (spatially). It follows that a feature selected to be a shading is not informative and is therefore not likely to have a high value in the perceptual bias level for the line-art sketch 220. Based on this example, it is observed that a perceptual bias level with respect to a feature under consideration can be estimated by finding out whether the feature is informative according to image data of the sketch. A lower content in information indicates a lower value of the perceptual bias level and hence the feature under consideration is less usable in the search for matched objects. This approach is adopted by the present invention in the estimation of the perceptual bias level.

In an exemplary embodiment, an expectation-maximization tensor voting (EMTV) technique is advantageously used to measure such information content and hence to estimate the perceptual bias level. The EMTV technique is selected as it is known to be useful in salient structure inference from noisy data seriously corrupted by outliners. Details of the EMTV technique are given by T.-P. Wu, S.-K. Yeung, J. Jia, C.-K. Tang and G. Medioni, "A closed-form solution to tensor voting: theory and applications," *IEEE Transactions on Pattern Analysis and Machine Intelligence*, vol. 34, pp. 1482-1495, August 2012, the disclosure of which is incorporated by reference herein.

The method for estimating a perceptual bias level with respect to a feature under consideration from a hand-drawn sketch comprises analyzing a statistical distribution of the feature by using an EMTV method to form an objective function having the statistical distribution's information parameterized by the perceptual bias level and then to maximize the objective function according to a set of iterative update rules, so as to automatically estimate the perceptual bias level based on the sketch alone without involving an extra database in the estimation. As examples for illustration, the statistical distribution's information may include a means and a variance if the statistical distribution of the feature is assumed a Gaussian distribution, or may include a vector means and a covariance matrix in case a multivariate Gaussian distribution is used to model the feature. The statistical distribution's information may further include a goodness-of-fit parameter from which the perceptual bias level may be derived. The EMTV method used for analyzing the statistical distribution is detailed as follows.

Consider a set of raw visual image features where the features are represented by d-dimensional feature vectors, $d>0$. Let $\{x_i \in \mathbb{R}^d | i=1 \ldots N\}$ be a set of feature vectors and he $\mathbb{R}^d$ be an underlying model of the distribution regarding the set $\{x_i\}$. It is desired to determine a model h that minimizes the measurement error:

$$\|x_i^T h\|. \tag{EQN. 1}$$

At the same time, it is also desired to minimize the variance of the estimated distribution model such that a set of unimportant features can be identified. Mathematically, it is done by minimizing $$\|h^T K_i^{-1} h\| \tag{EQN. 2}$$

where $K_i$ is the tensor representation for $x_i$ and $h^T K_i^{-1} h$ is the variance produced by h with respect to $x_i$. Note that a standard deviation is the square root of a variance.

To maximize robustness of the estimation, it is required to utilize a closed-form solution to tensor voting (CFTV) such that feature vectors can be communicated among themselves in order to filter out outliers. To do this, one needs to minimize the following measurement error:

$$\|K_i^{-1} - S_{ij}\|_F \qquad \text{(EQN. 3)}$$

where i and j are neighbors, and $$S'_{ij} = \exp\left(-\frac{\|x_i - x_j\|^2}{\sigma_d}\right) \cdot R''_{ij} K_j^{-1} R_{ij} \qquad \text{(EQN. 4)}$$

in which: $\sigma_d$ is a size of local neighborhood, or a scale parameter (which is a free parameter selected in tensor voting); and $R_{ij}''$ and $R_{ij}$ are transformation matrices. The transformation matrices $R_{ij}''$ and $R_{ij}$ and the tensors $K_i$ and $K_j$ can be computed by the CFTV method as shown in T.-P. Wu et al. (2012).

Based on EQNS. (1)-(3), the objective function, which is a complete-data log likelihood, is given by $$Q(\Lambda, \Lambda') = \sum_{G \in \psi} \log P(O, G | \Lambda) P(G | O, \Lambda') \qquad \text{(EQN. 5)}$$

where $G=\{r_i\}$ is a set of hidden states indicating if the feature vector $x_i$ (i.e. an observation) is an outlier ($r_i=0$) or an inliner ($r_i=1$), $\psi$ is a space containing all possible configurations of G of size N, and $\Lambda=\{\alpha, K, h, \sigma, \sigma_1, \sigma_2\}$ is a set of parameters to be estimated inside the EMTV framework (with $\Lambda'$ as the $\Lambda$ of the current stage), where K denotes $K=\{K_i^{-1}\}$. Under this objective function, the corresponding expectation is defined by $$w_i = \frac{\alpha\beta\exp\left(\frac{\|x_i^T h\|^2}{2\sigma^2}\right)\exp\left(\frac{\|h^T K_i^{-1} h\|^2}{\sigma_1^2}\right)}{\alpha\beta\exp\left(\frac{\|x_i^T h\|^2}{2\sigma^2}\right)\exp\left(\frac{\|h^T K_i^{-1} h\|^2}{\sigma_1^2}\right) + \frac{1-\alpha}{C}} \qquad \text{(EQN. 6)}$$

where $\beta=(2\sigma\sigma_1\pi)^{-1}$ is a normalization term, and C is a constant that models a uniform distribution. In EQN. (6), $w_i$ is actually the perceptual bias level of the respective feature. The estimation of $w_i$ is called the E-Step of the EMTV method.

In the EMTV method, there is another step called the M-Step, which is derived by maximizing the value of the objective function given by EQN. (5) with respect to $\Lambda$. The complete EMTV method alternately loops through the E-Step and the M-Step until the objective function converges, that is, until the unknowns in the E-Step and the M-Step do not substantially change. The M-Step is defined by the following equations:

$$\alpha = \frac{1}{N}\sum_i w_i, \qquad \text{(EQN. 7)}$$

$$K_i^{-1} = \frac{1}{\sum_{j \in G(i)} w_j}\left(\sum_{j \in G(i)} S'_{ij} w_j - \frac{\sigma_2^2}{2\sigma_1^2} h h^T w_i\right), \qquad \text{(EQN. 8)}$$

-continued $$h = \underset{h^*}{\operatorname{argmin}} \left\|\left(\sum_i x_i x_i^T w_i + \frac{\sigma^2}{\sigma_1^2}\sum_i K_i^{-1} w_i\right) h\right\|, \qquad \text{(EQN. 9)}$$

$$\sigma^2 = \frac{\sum_i \|x_i^T h\|^2 w_i}{\sum_i w_i}, \qquad \text{(EQN. 10)}$$

$$\sigma_1^2 = \frac{\sum_i \|h^T K_i^{-1} h\|^2 w_i}{\sum_i w_i} \qquad \text{(EQN. 11)}$$

and $$\sigma_2^2 = \frac{\sum_i \sum_{j \in G(i)} \|K_i^{-1} S'_{ij}\|_F^2 w_i w_j}{\sum_i w_i}. \qquad \text{(EQN. 12)}$$

In EQNS. (8) and (12), G(i) is a set of neighbors of i.

The set of iterative update rules mentioned above for maximizing the objective function is given by EQNS. (6)-(12).

Given a perceptual bias level $w_i$, the distance between features of the same type can be defined by $$W(x,y) = b_i D(x,y) \qquad \text{(EQN. 13)}$$

with $$b_i = \begin{cases} w_i & \text{if } w_i \geq t \\ 0 & \text{if } w_i < t \end{cases} \qquad \text{(EQN. 14)}$$

where x and y are features of the same type, t is a threshold and D is any user-defined distance function (e.g., the Euclidean distance).

Figure 3:
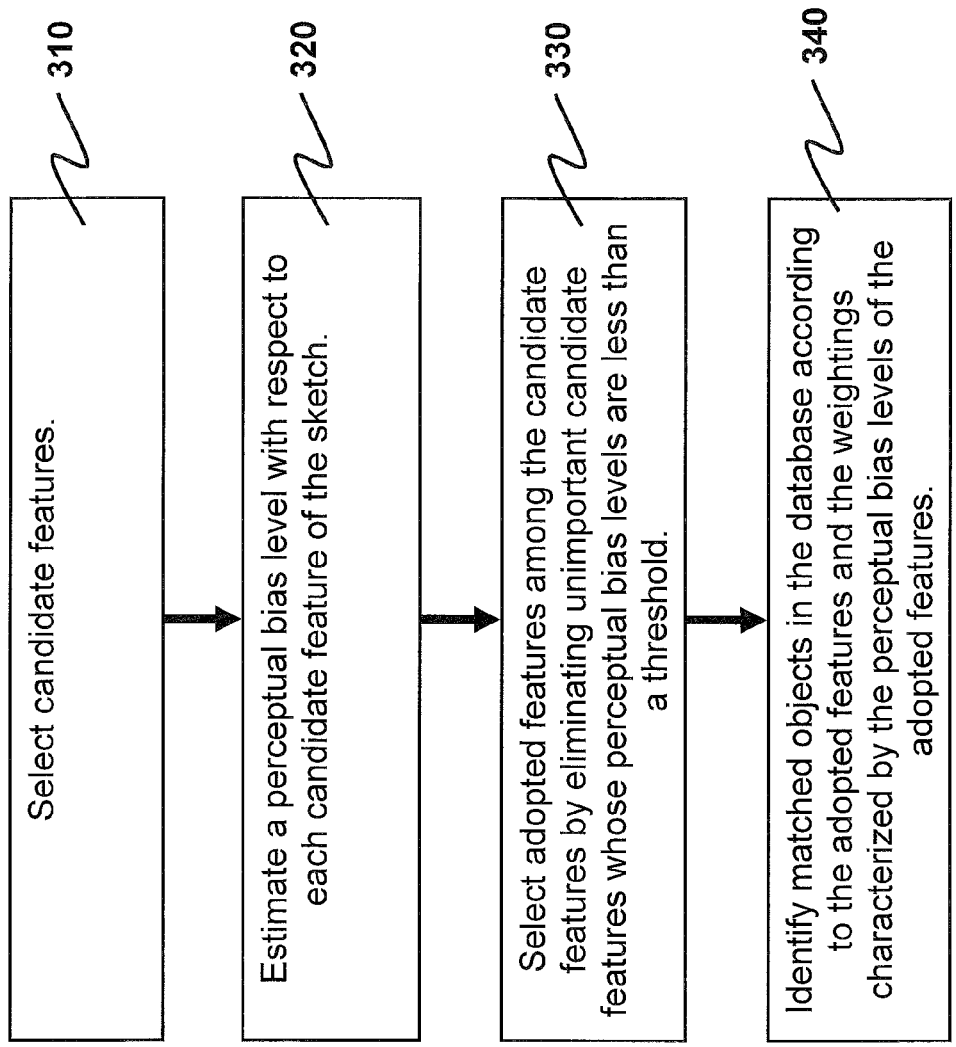
FIG. 3 depicts a flowchart illustrating a method for retrieving objects that match a hand-drawn sketch by making use of a perceptual bias level in accordance with an embodiment of the present invention.

The disclosed method of estimating a perceptual bias level may be incorporated into a method for retrieving one or more objects from an image or video database where the one or more objects match a hand-drawn sketch. FIG. 3 shows the retrieving method according to an embodiment of the present invention. In a first step 310, one or more candidate features are selected. Statistical distributions with respect to the one or more candidate features of the sketch are evaluated. The statistical distributions are analyzed in a second step 320 to generate perceptual bias levels for the one or more candidate features. In the second step 320, a perceptual bias level with respect to a chosen candidate feature is estimated according to the disclosed method detailed above, where the chosen candidate feature is any of the one or more candidate features. In a third step 330, one or more adopted features are selected among the one or more candidate features. The one or more adopted features are selected by eliminating one or more unimportant candidate features among the one or more candidate features wherein the perceptual bias level generated for any of the one or more unimportant candidate features is less than a threshold value. The threshold value is determined such that each of the one or more unimportant candidate features is not what the sketch's author substantially focused on when drawing the sketch. In case all the perceptual bias levels generated for the one or more candidate features are less than the threshold value, one candidate feature whose perceptual bias level is largest among the perceptual bias levels generated for the one or more candidate features is selected. In a fourth step 340, a search in the database is conducted to identify the one or more objects that match the sketch. The search is based on a similarity measurement according to the one or more adopted features. In the similarity measurement, a degree of closeness in an adopted feature between an object-under-test from the database and the sketch is computed. The degree of closeness may be computed in terms of a "distance" between the object-under-test and the sketch. The degree of closeness is deemed a contribution of this adopted feature in the similarity measurement. In the fourth step 340, a contribution of a chosen adopted feature in the similarity measurement is weighted by the perceptual bias level generated for the chosen adopted feature, where the chosen adopted feature is any of the one or more adopted features. In one embodiment, such contribution is computed according to EQNS. (13) and (14).

Figure 4:
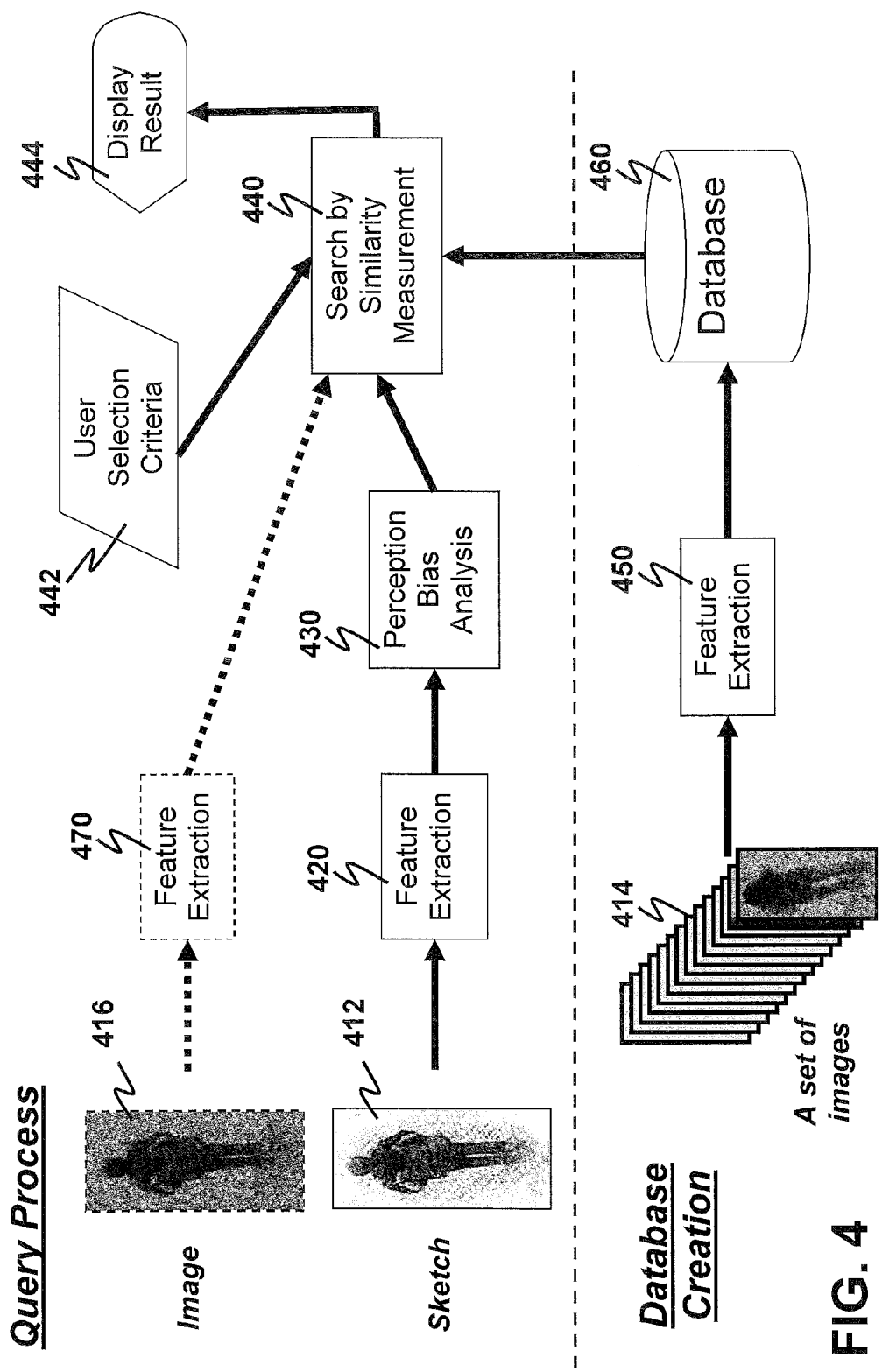
FIG. 4 depicts an example of a system for retrieving from an image or video database one or more objects that match a hand-drawn sketch in accordance with an embodiment of the present invention.

The disclosed method of estimating a perceptual bias level can also be utilized in a system for retrieving from an image or video database one or more objects that match a hand-drawn sketch. FIG. 4 depicts an example realization of this system. In a database creation process, a set of images 414 is processed by a first feature-extraction process 450 to obtain a first set of raw visual features solely from the set of the images 414. The first set of raw visual features is then stored in a database 460. In a query process, a hand-drawn sketch 412 is processed by a second feature-extraction process 420 for extracting a second set of raw visual features. The extracted raw features in the second set are then processed by an estimator 430 that performs a perceptual bias analysis to estimate perceptual bias levels with respect to the extracted raw features while the respective statistical distribution models for the extracted raw features are also estimated as side-products. The models provide statistical information of the extracted raw features in the second set. The second set of extracted raw features is then weighted according to the estimated perceptual bias levels. Based on the weighted statistical information, and according to selection criteria 442 provided by a user, a search process 440 is initiated to identify and retrieve from the database 460 one or more objects whose statistical information provided according to the first set of extracted raw features substantially matches the weighted statistical information. The search result is then displayed by a display unit 444. The system may also provide an option of retrieving objects that match a realistic photo image 416. A third feature-extraction process 470 is used to extract raw visual features of the image 416. Such visual features are used in the search process 440 to locate matched objects in the database 460.

As a remark, the methods disclosed herein enable video retrieval by a sketch, which is hand drawn by an artist, originated from his or her recollection without directly viewing the object of interest during drawing. It is further remarked that in contrast to most existing retrieval methods that work according to object categories, the methods disclosed herein allow using arbitrary sketches to retrieve similar objects that match.

The embodiments disclosed herein may be implemented using a general purpose or specialized computing device, computer processor, or electronic circuitry including but not limited to a digital signal processor (DSP), application specific integrated circuit (ASIC), a field programmable gate array (FPGA), and other programmable logic device configured or programmed according to the teachings of the present disclosure. Computer instructions or software codes running in the general purpose or specialized computing device, computer processor, or programmable logic device can readily be prepared by practitioners skilled in the software or electronic art based on the teachings of the present disclosure.

In some embodiments, the present invention includes a computer storage medium having computer instructions or software codes stored therein which can be used to program a computer or microprocessor to perform any of the processes of the present invention. The storage medium can include, but is not limited to, floppy disks, optical discs, Blu-ray Disc, DVD, CD-ROMs, and magneto-optical disks, ROMs, RAMs, flash memory devices, or any type of media or device suitable for storing instructions, codes, and/or data.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for retrieving one or more objects from an image or video database with the use of perceptual bias levels where the one or more objects match a hand-drawn sketch, the method comprising:

selecting one or more candidate features;

for a chosen candidate feature among the one or more candidate features, estimating a perceptual bias level with respect to the chosen candidate feature of the sketch, so as to generate a perceptual bias level for each of the one or more candidate features;

selecting one or more adopted features among the one or more candidate features by:

eliminating one or more unimportant candidate features among the one or more candidate features wherein the perceptual bias level generated for any of the one or more unimportant candidate features is less than a threshold; and if all the perceptual bias levels generated for the one or more candidate features are less than the threshold, selecting, from the one or more candidate features, one candidate feature whose perceptual bias level is largest among the perceptual bias levels generated for the one or more candidate features;

and searching in the database by a similarity measurement according to the one or more adopted features so as to identify the one or more objects, wherein a contribution of a chosen adopted feature in the similarity measurement is weighted by the perceptual bias level generated for the chosen adopted feature, the chosen adopted feature being any of the one or more adopted features;

wherein the estimating of a perceptual bias level with respect to the chosen candidate feature of the sketch comprises:

using an expectation-maximization tensor voting (EMTV) method to analyze a statistical distribution of the chosen candidate feature by first forming an objective function having the statistical distribution's information parameterized by the perceptual bias level and then maximizing the objective function according to a set of iterative update rules, so as to automatically estimate the perceptual bias level based on the sketch alone.

2. The method of claim 1, wherein:

the objective function, denoted as $Q(\Lambda, \Lambda')$, is given by $$Q(\Lambda, \Lambda') = \sum_{G \in \psi} \log P(O, G|\Lambda) P(G|O, \Lambda')$$

where:

$O = \{x_i\}$ is a set of feature vectors representing a set of raw visual image features of the sketch;

G is a set of hidden states indicating if the feature vector $x_i$ is an outliner or an inliner;

ψ is a space containing all possible configurations of G of size N, N being the number of $x_i$'s in O;

Λ={α, K, h, σ, $σ_1$, $σ_2$} is a set of parameters to be estimated by the EMTV method, K denoting K={$K_i^{-1}$} and h being an underlying model of the statistical distribution regarding O; and Λ' is a current stage of Λ;

the set of iterative update rules is given by $$w_i = \frac{\alpha\beta\exp\left(\frac{\|x_i^T h\|^2}{2\sigma^2}\right)\exp\left(\frac{\|h^T K_i^{-1} h\|^2}{\sigma_1^2}\right)}{\alpha\beta\exp\left(\frac{\|x_i^T h\|^2}{2\sigma^2}\right)\exp\left(\frac{\|h^T K_i^{-1} h\|^2}{\sigma_1^2}\right) + \frac{1-\alpha}{C}},$$

$$\alpha = \frac{1}{N}\sum_i w_i,$$

$$K_i^{-1} = \frac{1}{\sum_{j \in G(i)} w_j}\left(\sum_{j \in G(i)}\left(S'_{ij} w_j - \frac{\sigma_2^2}{2\sigma_1^2} hh^T w_i\right)\right),$$

$$h = \arg\min_{h^*}\left\|\left(\sum_i x_i x_i^T w_i + \frac{\sigma^2}{\sigma_1^2}\sum_i K_i^{-1} w_i\right)h\right\|,$$

$$\sigma^2 = \frac{\sum_i \|x_i^T h\|^2 w_i}{\sum_i w_i},$$

$$\sigma_1^2 = \frac{\sum_i \|h^T K_i^{-1} h\|^2 w_i}{\sum_i w_i},$$

and $$\sigma_2^2 = \frac{\sum_i \sum_{j \in G(i)} \|K_i^{-1} - S'_{ij}\|_F^2 w_i w_j}{\sum_i w_i},$$

where:
$w_i$ is the perceptual bias level;
$\beta = (2\sigma\sigma_1\pi)^{-1}$;
C is a constant that models a uniform distribution for $w_i$;
G(i) is a set of neighbors of i; and
$S_{ij}'$ is given by $$S'_{ij} = \exp\left(-\frac{\|x_i - x_j\|^2}{\sigma_d}\right) \cdot R''_{ij} K_j^{-1} R_{ij}$$

in which $\sigma_d$ is a size of local neighborhood or a scale parameter,
and $R_{ij}''$ and $R_{ij}$ are transformation matrices.

3. The method of claim 1, wherein the contribution is computed according to $$W(x,y) = b_i D(x,y)$$

with $$b_i = \begin{cases} w_i & \text{if } w_i \geq t \\ 0 & \text{if } w_i < t \end{cases}$$

where W(x, y) is a distance between features of the same type, $w_i$ is the perceptual bias level, x and y are features of the same type, t is a threshold and D is a pre-determined distance function.

4. An apparatus comprising one or more processors configured to execute a process for retrieving one or more objects from an image or video database, where the one or more objects match a hand-drawn sketch, according to the method of claim 1.

5. An apparatus comprising one or more processors configured to execute a process for retrieving one or more objects from an image or video database, where the one or more objects match a hand-drawn sketch, according to the method of claim 2.

6. An apparatus comprising one or more processors configured to execute a process for retrieving one or more objects from an image or video database, where the one or more objects match a hand-drawn sketch, according to the method of claim 3.

7. A system comprising a database having a first set of raw visual features extracted from a set of images, and one or more processors configured to execute a query process, the query process comprising:
  extracting a second set of raw visual features from a hand-drawn sketch;
  for each feature in the second set of raw visual features, estimating a perceptual bias level with respect to said each feature, and obtaining a statistical distribution model for said each feature; and
  searching in the database to identify one or more objects in the set of images where statistical information of the one or more objects substantially matches weighted statistical information obtained by weighting statistical information of the raw visual features in the second set according to the perceptual bias levels estimated for the second set of raw visual features;
  wherein the estimating of a perceptual bias level with respect to said each feature comprises:
  using an expectation-maximization tensor voting (EMTV) method to analyze a statistical distribution of said each feature by first forming an objective function having the statistical distribution's information parameterized by the perceptual bias level and then maximizing the objective function according to a set of iterative update rules, so as to automatically estimate the perceptual bias level based on the sketch alone.

8. The system of claim 7, wherein the one or more processors are further configured to execute a database creation process comprising:
  extracting the first set of raw visual features from the set of images; and
  storing the first set of raw visual features in the database.

9. The system of claim 7, wherein the query process further comprises:
  extracting a third set of raw visual features from a realistic photo image for locating matched objects in the database.

10. The system of claim 7, wherein:
the objective function, denoted as Q(Λ, Λ'), is given by $$Q(\Lambda, \Lambda') = \sum_{G \in \psi} \log P(O, G|\Lambda) P(G|O, \Lambda')$$

where:
  O={$x_i$} is a set of feature vectors representing the second set of raw visual features;
  G is a set of hidden states indicating if the feature vector $x_i$ is an outliner or an inliner;
  ψ is a space containing all possible configurations of G of size N, N being the number of $x_i$'s in O;

$\Lambda = \{\alpha, K, h, \sigma, \sigma_1, \sigma_2\}$ is a set of parameters to be estimated by the EMTV method, K denoting $K = \{K_i^{-1}\}$ and h being an underlying model of the statistical distribution regarding O; and $\Lambda'$ is a current stage of $\Lambda$;

the set of iterative update rules is given by $$w_i = \frac{\alpha\beta\exp\left(\frac{\|x_i^T h\|^2}{2\sigma^2}\right)\exp\left(\frac{\|h^T K_i^{-1} h\|^2}{\sigma_1^2}\right)}{\alpha\beta\exp\left(\frac{\|x_i^T h\|^2}{2\sigma^2}\right)\exp\left(\frac{\|h^T K_i^{-1} h\|^2}{\sigma_1^2}\right) + \frac{1-\alpha}{C}},$$

$$\alpha = \frac{1}{N}\sum_i w_i,$$

$$K_i^{-1} = \frac{1}{\sum_{j \in G(i)} w_j}\left(\sum_{j \in G(i)}\left(S'_{ij} w_j - \frac{\sigma_2^2}{2\sigma_1^2} h h^T w_i\right)\right),$$

$$h = \arg\min_{h^*}\left\|\left(\sum_i x_i x_i^T w_i + \frac{\sigma^2}{\sigma_1^2}\sum_i K_i^{-1} w_i\right) h\right\|,$$

$$\sigma^2 = \frac{\sum_i \|x_i^T h\|^2 w_i}{\sum_i w_i},$$

$$\sigma_1^2 = \frac{\sum_i \|h^T K_i^{-1} h\|^2 w_i}{\sum_i w_i},$$

and $$\sigma_2^2 = \frac{\sum_i \sum_{j \in G(i)} \|K_i^{-1} - S'_{ij}\|_F^2 w_i w_j}{\sum_i w_i},$$

where:
$w_i$ is the perceptual bias level;
$\beta = (2\sigma\sigma_1\pi)^{-1}$;
C is a constant that models a uniform distribution for $w_i$;
G(i) is a set of neighbors of i; and
$S_{ij}'$ is given by $$S'_{ij} = \exp\left(-\frac{\|x_i - x_j\|^2}{\sigma_d}\right) \cdot R''_{ij} K_j^{-1} R_{ij}$$

in which $\sigma_d$ is a size of local neighborhood or a scale parameter,
and $R_{ij}''$ and $R_{ij}$ are transformation matrices.

* * * * *